United States Patent
Reid

(10) Patent No.: US 7,476,314 B2
(45) Date of Patent: *Jan. 13, 2009

(54) KEYED SYSTEM FOR CONNECTION OF FILTER CARTRIDGE TO FILTER HOLDER

(76) Inventor: Roger P. Reid, c/o Omnipure Filter Company, Inc., 1904 Industrial Way, Caldwell, ID (US) 83605

(*) Notice: Subject to any disclaimer, the term of this patent is extended or adjusted under 35 U.S.C. 154(b) by 364 days.

This patent is subject to a terminal disclaimer.

(21) Appl. No.: 11/316,373

(22) Filed: Dec. 20, 2005

(65) Prior Publication Data

US 2006/0162305 A1    Jul. 27, 2006

Related U.S. Application Data

(63) Continuation-in-part of application No. 10/786,655, filed on Feb. 24, 2004, now Pat. No. 6,977,006, which is a continuation-in-part of application No. 09/928,666, filed on Aug. 11, 2001, now Pat. No. 6,695,891, application No. 11/316,373, which is a continuation-in-part of application No. 11/200,864, filed on Aug. 9, 2005, now Pat. No. 7,172,693, which is a continuation-in-part of application No. 10/372,040, filed on Feb. 21, 2003, now Pat. No. 6,926,826.

(60) Provisional application No. 60/358,692, filed on Feb. 21, 2002, provisional application No. 60/272,221, filed on Feb. 27, 2001, provisional application No. 60/224,632, filed on Aug. 11, 2000.

(51) Int. Cl.
*B01D 35/30* (2006.01)
*B01D 27/08* (2006.01)

(52) U.S. Cl. .............. 210/232; 210/249; 210/435; 210/444; 285/914

(58) Field of Classification Search .......... 210/232, 210/249, 435, 444; 285/914
See application file for complete search history.

(56) References Cited

U.S. PATENT DOCUMENTS 2,568,196 A    9/1951    Kennedy .............. 210/131

(Continued)

FOREIGN PATENT DOCUMENTS

DE    198 27 297 A1    12/1999

(Continued)

*Primary Examiner*—Thomas M Lithgow
(74) *Attorney, Agent, or Firm*—Pedersen & Co., PLLC; Ken J. Pedersen; Barbara S. Pedersen

(57) ABSTRACT

Embodiments of a key system for filters and their connecting heads, brackets, or other holders are shown. The filter cartridge and its holder each have a keyed surface, one being a protruding "key" and one being a recessed "lock". Cooperation of these keyed surfaces is required in order for the filter cartridge to be installed in the holder, so that mis-matched cartridges cannot be installed into the holder, for example, to prevent a particular type of cartridge from being placed in a filtration or other process where it would be inappropriate, or undesired. The keyed surfaces are selectively locate-able preferably at different circumferential locations on a perimeter of the filter and a corresponding location on a perimeter of the head/holder. The perimeter may be, for example, on an outer shoulder surface of a filter and an inner surface of a valve head, or on outer and inner surfaces of connectors that provide a liquid seal between the filter and the head/holder.

11 Claims, 11 Drawing Sheets

U.S. PATENT DOCUMENTS

| | | | |
|---|---|---|---|
| 4,211,439 A | 7/1980 | Moldestad | 285/27 |
| 4,267,042 A | 5/1981 | Hoffmann | 210/440 |
| 4,877,521 A | 10/1989 | Petrucci et al. | 210/440 |
| 4,948,505 A | 8/1990 | Petrucci et al. | 210/238 |
| 4,956,086 A | 9/1990 | Thomsen et al. | 210/440 |
| 5,017,285 A | 5/1991 | Janik et al. | 210/232 |
| 5,035,797 A | 7/1991 | Janik | 210/232 |
| 5,108,598 A | 4/1992 | Posner | 210/232 |
| 5,114,572 A | 5/1992 | Hunter et al. | 210/120 |
| RE34,031 E | 8/1992 | Thomsen et al. | 210/232 |
| RE34,050 E | 9/1992 | Thomsen et al. | 210/232 |
| 5,186,829 A | 2/1993 | Janik | 210/232 |
| 5,236,579 A | 8/1993 | Janik et al. | 210/94 |
| 5,486,288 A | 1/1996 | Stanford et al. | 210/443 |
| 5,651,887 A | 7/1997 | Posner et al. | 210/232 |
| 5,766,463 A | 6/1998 | Janik et al. | 210/440 |
| 5,837,137 A | 11/1998 | Janik | 210/232 |
| 6,001,249 A | 12/1999 | Bailey et al. | 210/232 |
| 6,048,455 A | 4/2000 | Janik | 210/440 |
| 6,068,770 A | 5/2000 | Niermeyer et al. | 210/447 |
| 6,080,313 A | 6/2000 | Kelada | 210/631 |
| 6,187,188 B1 | 2/2001 | Janik et al. | 210/440 |
| 6,458,269 B1 | 10/2002 | Bassett et al. | 210/444 |
| 6,695,891 B2 * | 2/2004 | Reid | 55/495 |
| 6,776,906 B2 * | 8/2004 | Reid | 210/232 |
| 6,926,826 B2 * | 8/2005 | Reid | 210/232 |
| 6,977,006 B2 * | 12/2005 | Reid | 55/495 |
| 7,138,052 B2 * | 11/2006 | Reid | 210/232 |
| 7,172,693 B2 * | 2/2007 | Reid | 210/232 |
| 7,186,337 B2 * | 3/2007 | Reid | 210/232 |

FOREIGN PATENT DOCUMENTS

| | | |
|---|---|---|
| DE | 19925297 | 7/2000 |
| DE | 199 60 600 A1 | 6/2001 |
| EP | 0 231 862 A2 | 1/1987 |
| EP | 0 278 771 A1 | 2/1988 |
| EP | 0 580 501 B1 | 7/1993 |
| GB | 771968 | 10/1955 |
| WO | WO 94/02407 | 3/1994 |
| WO | WO 97/45362 | 4/1997 |
| WO | WO 03/031020 A1 | 4/2003 |

* cited by examiner

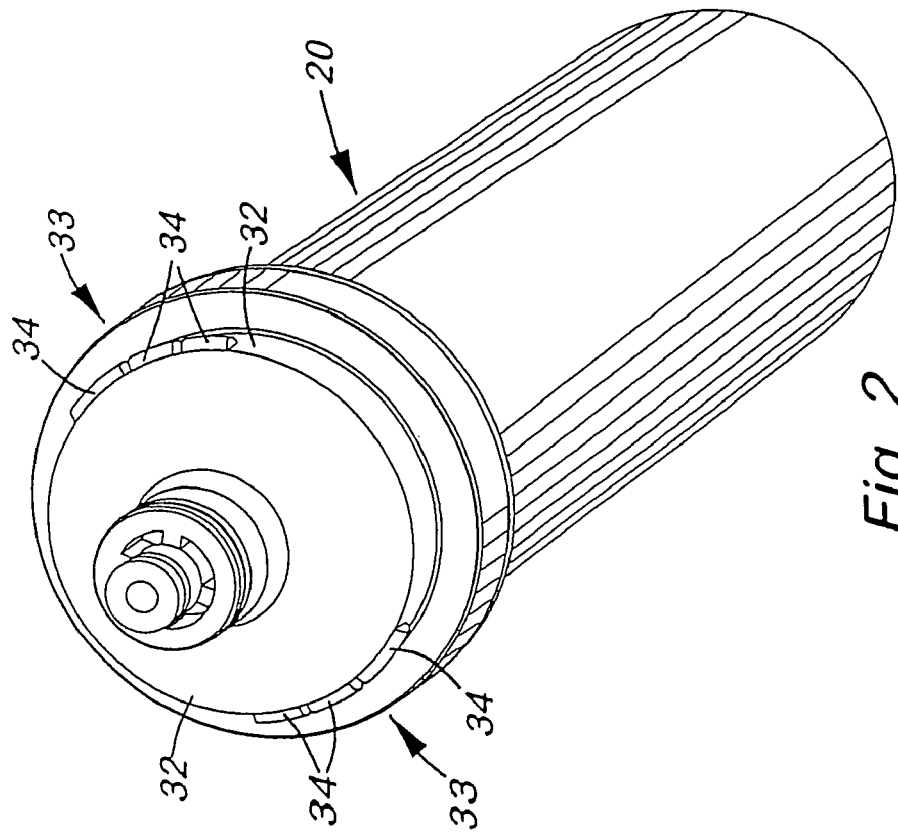
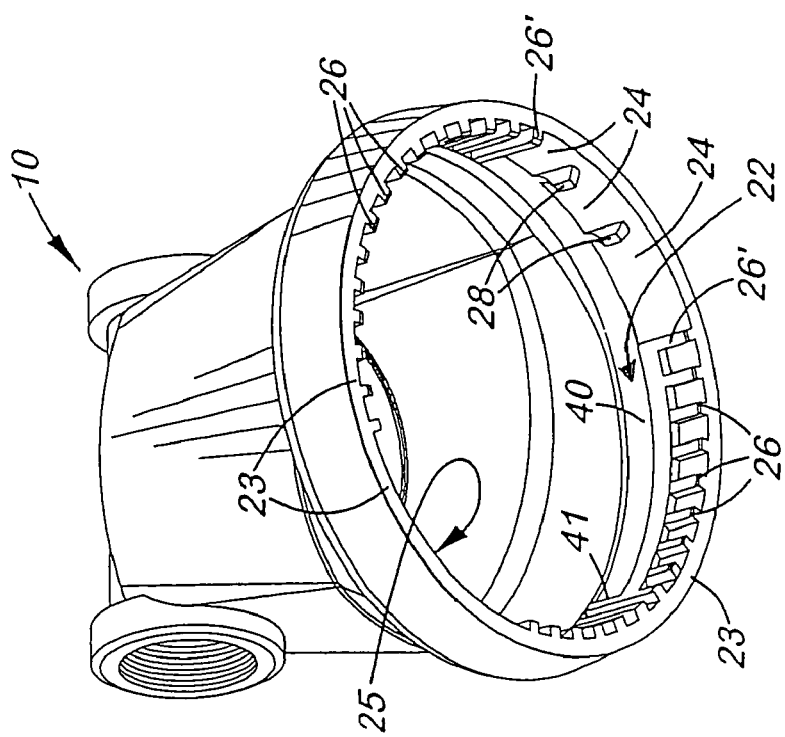

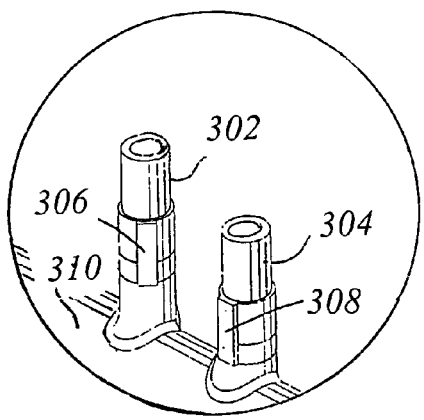
Fig. 23
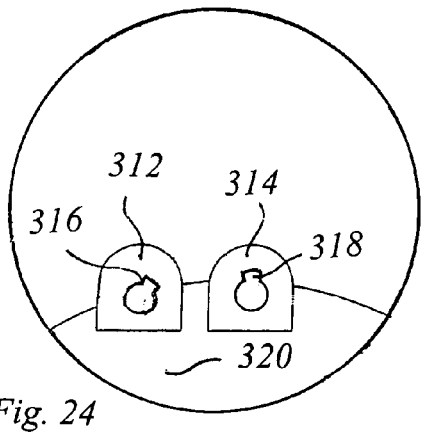
Fig. 24
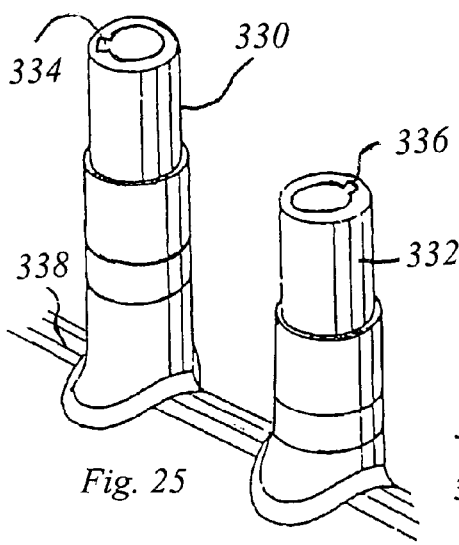
Fig. 25
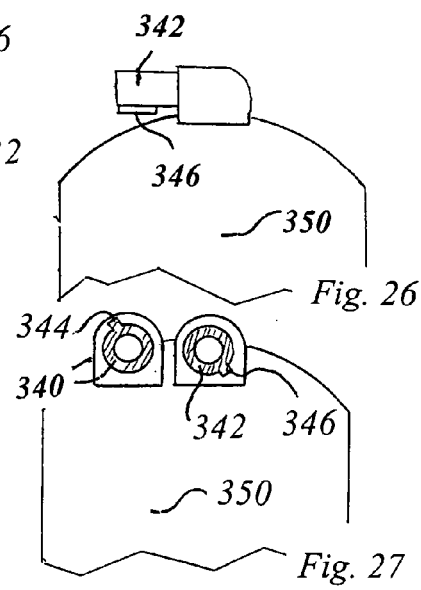
Fig. 26
Fig. 27
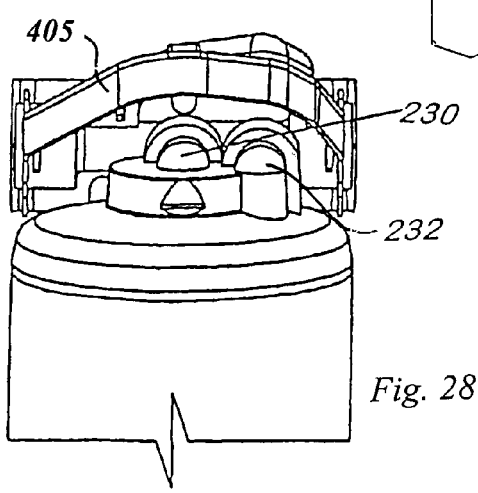
Fig. 28

KEYED SYSTEM FOR CONNECTION OF FILTER CARTRIDGE TO FILTER HOLDER

This application is a continuation-in-part of patent application Ser. No. 10/786,655, filed Feb. 24, 2004, and issued on Dec. 20, 2005 as U.S. Pat. No. 6,977,006, which is a continuation of patent application Ser. No. 09/928,666, filed Aug. 11, 2001, and issued on Feb. 24, 2004 as U.S. Pat. No. 6,695,891, which is a non-provisional application claiming priority of provisional patent application Ser. No. 60/224,632, filed Aug. 11, 2000, and also claims priority of prior, provisional patent application Ser. No. 60/272,221, filed Feb. 27, 2001, which are herein incorporated by this reference. This application also a continuation-in-part of, and claims priority of, patent application Ser. No. 11/200,864, filed on Aug. 9, 2005, and issued on 06 Feb. 2007 as U.S. Pat. No. 7,172,693, which is a continuation of patent application Ser. No. 10/372,040, filed Feb. 21, 2003, and issued as U.S. Pat. No. 6,926,826 on Aug. 9, 2005, which claims priority of provisional application 60/358,692, filed Feb. 21, 2002.

BACKGROUND OF THE INVENTION

FIELD OF THE INVENTION

This invention relates generally to fluid filters and filter cartridges and connections for the filters/cartridges to piping, valving, brackets, and other holders that cooperate with the filters/cartridges to make them operative in a flowing fluid system. More specifically, this invention relates to a system for "keying" a particular filter cartridge or filter to a particular cooperating filter head member or filter valve head.

SUMMARY OF THE INVENTION

The invention is an apparatus and method wherein a portion of a fluid cartridge-holder connection is structurally adapted so that only matched filter cartridges and holders can cooperate to allow installation of the filter cartridge in the holder and/or to form a fluid seal. In other words, each filter cartridge and holder combination or "set" is "keyed" so that only that particular filter cartridge design mates with that holder. According to the invention, there are created various cartridge-holder sets that each have the adaptation, but the adaptation is slightly offset for each set compared to the other sets. This way, a filter cartridge from one set may not be mixed with a cartridge from another set, and, therefore, a filter cartridge may not be installed on any but its own matching holder.

The adaptation preferably involves a varying location of a "key" protrusion and a "lock" recess combination, such as a tab-slot combination, typically with mating protrusion(s) and recess(es) being at a certain angle on a circumference for one cartridge-holder set and a mating protrusion(s) and recess(s) of a similar or identical shape being at a different angle on the circumference for another cartridge-holder set, and so on, for each similarly-shaped-but-differently-located-adaptation cartridge and holder set. In other words, the key protrusion and the lock recess are selectably locateable around cooperating perimeters of a filter cartridge and its holder. The key and lock structures (hereafter typically called "key protrusion" or "protrusion" and "lock recess" or "recess", respectively) are preferably rigidly molded or otherwise permanently placed on/in the filter cartridge and holder, and so they are not considered moveable. They are, however, easily changed in the molding or other manufacturing process, that is, they are easily selectable by locating them at different angles/locations around a circumferential surface.

This system may include a plurality of sets of filters and holders, each set having a differently-located key and lock, wherein the key and lock of each set cooperate with each other to allow that filter to be installed in that holder, but that filter may not be installed in any other holder because the key or lock of that filter does not cooperate with the key or lock of the other holder. The term "key or lock" is used because the key protrusions may be placed on either the filter or the holder, and the lock recess may therefore be placed on the other item.

Thus, for example, a water or beverage filtration facility, experimental pilot plant, or other filter user may control filter cartridge placement accurately. A facility with multiple, different filtering applications may have filter cartridges on hand for each of the applications, but the cartridges will not be confused. For example, in a facility in which there are two different applications, many of the two different types of filter cartridges may be kept in stock and even may be mixed during storage or handling, but the filter cartridges will not be mixed when installed into the filter holders. This is because the filter holder and the filter cartridges for the first application are "keyed" differently than the filter holder and the filter cartridges for the second application. The terms "keying" or "keyed" refer generally to how and where the entire key system is located or accomplished, that is, to the positioning or style of either one or both of the cooperating key and lock structures, rather than specifically to only the location of the "key protrusion." All the filter cartridges for the first application are keyed the same, that is, to match the first application holder, and all the filter cartridges for the second application are keyed the same, to match the second application holder. The keying for the first application and the keying for the second application does not need to be very different, but may be merely, for example, a slightly different angular position for the two protrusions and recesses.

Also, a filter manufacturer may control his product lines more carefully by using the invented key system. A manufacturer may key his holders and filter cartridges differently for different countries, different clients, different distributors, or for different time periods. This technique may be used to prevent unauthorized or low-quality copies of the manufacturer's filter cartridges from easily being made. With so many differently-keyed cartridges in the marketplace provided by the original manufacturer, the incentive to provide cheap, low quality copies will be minimized, due to the expense of retooling for each "key and lock" set.

The key system may include many different protrusion and recess structures, for example, tabs and slots (typically thin or elongated bar and channel structures or elongated dove-tail structures), bumps and holes (typically rounded or mounded structures with cooperating valleys or holes), wedges and wedge-shaped wells (typically circular section structures); and many other shapes. If a cartridge must be rotated on its longitudinal axis to be installed in a holder, leeway in the recess structure is supplied so that the protrusion may enter it while the cartridge still has a radial distance to turn. For example, in the case of an elongated filter that is pushed up into a filter head and then rotated on its axis to install its top end into a filter head, the recess comprises an axial portion for allowing axial insertion and a radial portion for radial rotation of the filter cartridge relative to the filter head.

The key system structures are located on surfaces of filter cartridges (or "filters") and holders that contact each other during connection of the cartridge to the holder. This may be either surfaces that are involved in mainly providing a physical connection between the cartridge and holder or that also are involved in providing a fluid connection between the cartridge and the holder.

By "holder" is meant any of a variety of devices that receive and seal to a replaceable filter or filter cartridge. This can include a valve head (including valving to shut off piping when the cartridge is removed), a filter bracket that supports the cartridge and provides fluid flow conduits into and out of the cartridge, and other devices that contact and are in fluid communication with the cartridge.

By "filter" or "filter cartridge" is meant any container of filtration or treatment media that is connected to a holder for fluid communication with the holder to filter and/or treat the fluid brought into it via the holder. The keyed system invention may be applied to whatever structure of a filtering unit is inserted into the head or other holder, which might be a unitary filter or a filter cartridge encased partially in an outer housing below the level where the filter cartridge engages in the head.

BRIEF DESCRIPTION OF THE DRAWINGS

FIG. 1 is a bottom perspective view of one embodiment of a filter head according to the invention, illustrating one embodiment of recesses for the invented key system.

FIG. 2 is a top perspective view of one embodiment of a filter cartridge according to the invention, illustrating an embodiment of protrusions for the invented key system cooperating with the recesses of the filter head of FIG. 1.

FIGS. 23 and 24 are details of two keyed male tubes and two keyed female tubes, respectively, wherein the male tubes may be provided on either a holder/bracket or a filter, and the female tubes may be provided on the other, cooperating item, as "key and lock" may be switched in position on the holder and filter.

FIG. 25 illustrates embodiments of female tubes on a holder/bracket, each tube having a slot.

FIG. 26 illustrates a side view of a filter embodiment with male tubes adapted for connection to the female tubes of FIG. 25.

FIG. 27 illustrates another view of the filter embodiment of FIG. 26, showing both male tubes on the top of the filter.

FIG. 28 is a partial view of one embodiment of a filter connected to one embodiment of a bracket, and with a fastening device being pivoted toward the filter top end to secure the filter to the bracket.

DETAILED DESCRIPTION OF PREFERRED EMBODIMENTS OF THE INVENTION

Figure 4:
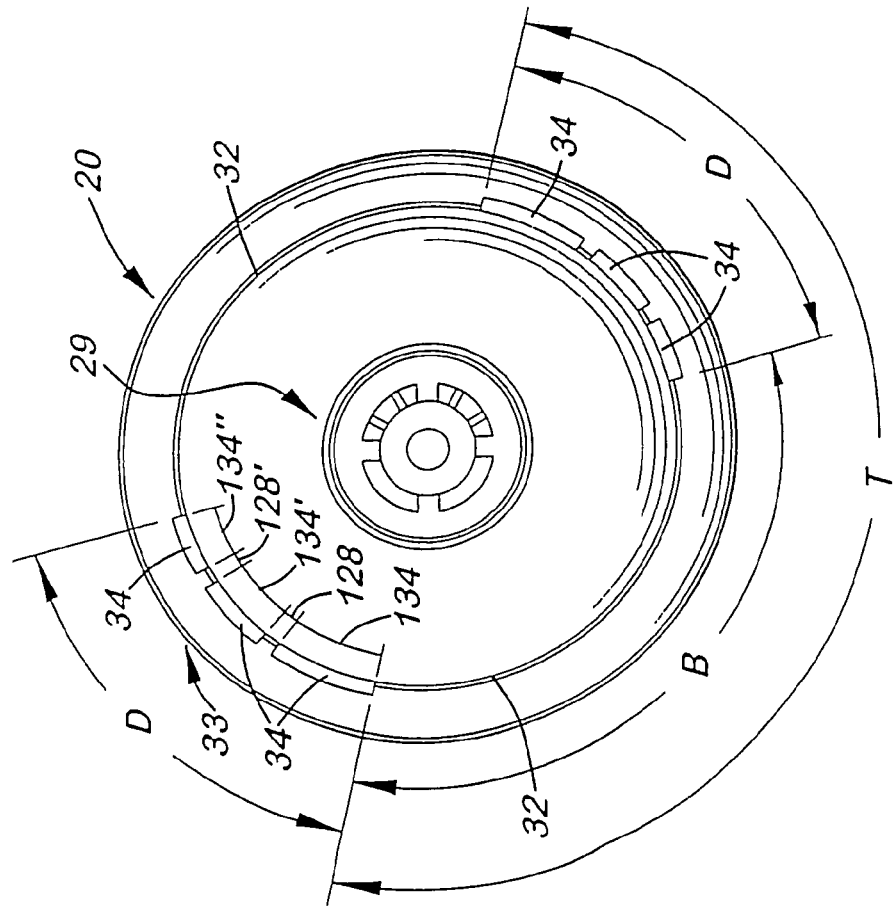
FIG. 4 is a top view of the filter cartridge of FIG. 2.

Referring to the Figures, there are shown several, but not the only embodiments of the invented key system. FIGS. 1-11 illustrate a filter cartridge keyed shoulder embodiment of the invented keyed system. FIGS. 12-22 illustrate a tubular connector embodiment of the invented keyed system.

The key system structures are located on surfaces of filter cartridges (or "filters") and holders that contact each other during connection of the cartridge to the holder. This may be either surfaces that are involved in mainly providing a physical connection between the cartridge and holder or that also are involved in providing a fluid connection between the cartridge and the holder.

An example of key system structure on surfaces that are involved in providing physical connection, rather than fluid connection, is the key system structure on a shoulder of a filter cartridge that fits up into a valve-head holder. These areas are surfaces that do not normally liquid-seal to each other, but must clear each other if the end of the filter cartridge is to fit up inside the interior cavity of the valve-head. The top circumferencial shoulder of the filter cartridge, and the inner surface of a valve-head, typically have areas that come in very close contact, but that are not directly involved in forming a liquid seal between the cartridge and the valve-head. These non-liquid-sealing areas may be keyed so that only a cartridge with a certain keyed surface shape may extend far enough up into the valve-head to be installed and locked into place. For example, tabs or other protrusions may be provided on the top surface of a filter spaced outward from an inlet-outlet neck, but external to the liquid-receiving passages. These filter cartridge protrusions may mate or "nest" in identically-located recesses on the inside surface of the valve-head that receives the cartridge, wherein the valve-head recesses are also external to the cartridge/valve-head liquid-receiving passages.

The keyed structure on the filter shoulder and the inner surface of the valve-head holder may be said to be located around the outer circumference of a shoulder of the top end of the filter cartridge and the cooperating or corresponding inner circumference of the valve-head cavity. Preferably the protruding "key" structure comprises a plurality of protrusions located within an arc of about 90 degrees or less around the circumference on which it lies, or more preferably within about 70 degrees or less. The cooperating recess structure is preferably located in the cavity surface, facing the filter cartridge shoulder, and, likewise, the same number of recesses are located within the same amount of circumference, preferably about 90 or less, and, more preferably, about 70 degrees or less. In this type of embodiment, the protruding and recessed structures do not form a liquid seal(s) between the filter cartridge and the valve-head, because other structure typically nearer the central axis of the filter cartridge and head serve that purpose. While this preferred key system locates the protrusions on the filter cartridge shoulder and the recesses on the head, the opposite is envisioned, wherein the protrusions may be inside the filter head and the recesses may be on the filter cartridge.

Another type of embodiment of the keyed system involves the structure that create a fluid seal between the filter cartridge and the holder, for example, the inlet and outlet ports of the filter cartridge and the respective, cooperating ports/tubes in the holder that convey liquid to and from the cartridge. In this type of embodiment, the protruding and recessed structures are located around the inner and outer circumference of a tubular connector, comprising a male tube and female receiver, that allow connection of the filter cartridge and the holder, wherein fluid is conducted through the tubular conductor(s) once the cartridge seals to the holder. An example of such a tubular connector key system includes one in which both the filter holder's inlet and outlet and both the filter cartridge's inlet and outlet are all tubular and are all keyed. Another example of such a tubular connector key system includes one in which only one of the filter holder's inlet and outlet, and only the corresponding one of the filter's inlet and outlet are keyed.

For example, a filter holder's inlet tube and an outlet tube (that direct flow to a cartridge and from the cartridge, respectively) each have an elongated axial tab that protrudes out from the outer cylindrical surface of the inlet tube and outlet tube at a chosen circumferential ( also called "radial" or "angular" to imply non-axial) location or locations (that is, at different places on the circumference of the tube surfaces). Likewise, the inner cylindrical surfaces of the cartridge's cooperating female tubes (into which the holder inlet tube and outlet tube slide and seal) have channels or "slots" recessed into the surfaces at corresponding circumferential positions. This way, the holder inlet and outlet tubes slide into the cartridge ports, with the holder tabs sliding into the cartridge slots without significant resistance. Another cartridge with slots at a different circumferential location, on either one its ports, would not receive the holder tubes and, hence, could not be accidentally or incorrectly installed in that particular holder. In such a case, where the filter cartridge has two tubes (inlet and outlet ports), each of the ports could have a different slot circumferential location, as long as the holder is made to match. For example, the holder's inlet tube tab (and corresponding slot on the cartridge inlet port) could be at "straight up" at 0 degrees, while the tab on the holder's outlet tube (and corresponding slot on the cartridge outlet port) could be at 30 degrees offset relative to the inlet tabs and slots. With this type of system, for example, varying additional different cartridge and holder sets each by an additional 30 degrees, many different sets of keyed cartridges and cooperating holders may be made. Many other amounts besides 30 degrees could be chosen, but this amount of offset gives many different combinations while providing an offset easily seen and judged by a person. The inlet tabs and slots and the outlet tabs and slots may be varied independently, for example, many sets may have the inlet tabs and slots at zero (0) degrees, while the sets may have differently-positioned outlet tabs and slots. Or, sets may have inlet tabs and slots that vary from set to set by 10 degrees, while those sets' outlet tabs and slots may vary by 15 degrees, for example. Or, the inlet tubular connector may have tab(s) and slot(s), while the outlet tubular connector has none, or the outlet tubular connector may have tab(s) and slot(s), while the inlet tubular connector has none. The mathematics of such a system suggest that practically an "endless" number of sets with different key system structures may be designed.

Other key system styles are envisioned, which allow generally flat or smooth surfaces of the filter cartridge and the holder that conventionally would contact each other to instead include a key system structure that ensures that only a particular type of filter cartridge may be installed in a particular holder. The key system structure of the various sets of filter cartridge and cooperating holders/valve-heads is typically invisible once the filter cartridge is installed. While this may result in differently-keyed filter cartridges having substantially similarly-shaped outer housings, a manufacturer may include indicia on the outer surface of the filter cartridge to indicate the different media or other filter differences. Also, a user may look at the key system structure as long as the filter cartridge is uninstalled. In any event, when the user attempts to install a cartridge, only properly-keyed cartridges can be installed into the holder/valve-head/manifold.

Keyed Filter Cartridge Shoulder (FIGS. 1-11)

Referring to FIGS. 1-11, there is shown a preferred, but not the only embodiment, of the invented key system for a filter cartridge and a filter holder (hereafter also called a "filter head"). The preferred filter head 10 and cooperating filter cartridge 20 are illustrated separately in FIGS. 1 and 2, wherein one may see the "lock" recess structure included in the head 10 and the "key" protrusion structure included on the filter cartridge 20. One may understand from this Description that embodiments of the invention also include a mirror-image arrangement, wherein "key" protrusions are on the head 10 and cooperating "lock" recesses are on the filter cartridge 20. Or, a combination of the two arrangements may be used, wherein one or more sets of "lock" recesses are on the head and cooperating "key" protrusions are on the filter cartridge, plus one or more sets of protrusions on the head and cooperating recesses on the filter cartridge.

The preferred embodiment of filter head may be of the general type illustrated by the systems in U.S. Pat. No. 4,857, 189 and Design 356,625, and, once the disclosure of the present invention is viewed, one of skill in the art will be able to construct a filter head that will be operative and operatively connect with a cooperating filter cartridge. Cartridges conventionally built for such filter head systems are shown in U.S. Pat. No. 4,857,189 and Design 356,625, for example.

The following discussion describes the preferred embodiment shown in the Figures, plus comments on some variations. One of average skill may envision alternative embodiments besides those mentioned that are within the scope of the invention.

In the preferred embodiment, the recess structure 22 in the head comprises an axial portion and a circumferential or "radial lock" portion. The axial portion preferably comprises a plurality of lock recesses 24 in the inner, lower surface of the head 10, which might be called the "inside rim" of the filter head near the outer edge 23 of the head. The lock recesses 24 are separated by partition ridges 28, which are spaced apart on, and protrude radially inward from, the surfaces of the lock recesses 24. In combination with adjacent ridges 26', partition ridges 28 define the circumferential length of each lock recess 24. The radial lock portion 40 of the recess structure 22 comprises a circumferentially-extending recess, generally but not necessarily exactly, transverse to the axis of the head 10 and the filter 10 and located "above" ridges 26.

In the preferred molded structure of the interior of the head 10, ridges 26 and partition ridges 28 serve as obstacles for any improperly keyed filter cartridge to be inserted into the filter head 10, and also, once the filter cartridge has been rotated on its axis, as obstacles for cartridge removal. Once the filter cartridge is inserted axially past the partition ridges 28, by the key protrusions 34 sliding into the head through the lock recesses 24, the filter cartridge may then be rotated so that the key protrusions 34 slide radially into the radial lock portion 40. The filter cartridge is preferably operable only once the filter cartridge has been inserted axially to the full extent desired and the filter cartridge has been rotated to lock the cartridge into head, and preferably only a properly keyed filter cartridge can be installed.

The ridges 26 illustrated in FIG. 1 are one example of many embodiments that help to define the lower boundary of the radial lock portion 40, and that lock the filter cartridge from axial movement by retaining the key protrusions 34 in the lock portion 40. The plurality of closely-spaced ridges 26 are preferred because they provide a barrier to axial cartridge movement while minimizing the amount of plastic needed in molding of the head 10. Alternatively, each set of ridges 26 may have the space between the ridges 26 filled in, that is, replaced with a solid, continuous structure that protrudes, relative to the recessed lock portion 40, inward toward the central axis of the head. Or, ridges 26 may be reduced in number or only occupy part of the space below the lock portion 40. In other words, the structure located "below" the radial lock portion 40 near outer edge 23, and serving as an obstacle to axial movement, may be of various shapes, size, and locations as long as one or more protrusion 33 on the filter cartridge is blocked by said structure. At a minimum, therefore, there should be inwardly-protruding structure below at least one or more key protrusions 34 when one or more of the key protrusions 34 in positioned in the lock portion 40. Not all key protrusions need to be received/engaged in the lock portion, when the filter cartridge is "fully rotationally engaged," which means the point at which the filter cartridge is rotated to the fullest extent allowed by a rotation stop in the lock portion. To limit rotation of the filter cartridge, specifically, to limit radial movement of the key protrusions 34 in the radial lock portion 40, a rotation stop surface 41 is provided by extensions of ridges 26 or other structure. Thus, radial lock portions of various lengths will have a rotation, even in the case of closely adjacent sets of lock recesses to prevent rotation of the key protrusions past the radial lock portion and into the space above the adjacent set of lock recesses.

In the head 10 of the Figures, the lock recesses 24 are three in number and are of different circumferential lengths, specifically, three recesses of long, medium and short length relative to each other. Other numbers and lengths/sizes may be used, for example, two or four recesses, or more, and one long and two short recesses, or two long and two short recesses, or a plurality of recesses all of differing lengths. As in a lock and key system for a door latch, many different combinations may be devised, and are included in the invention.

While there may be only one set of recess structure and one cooperating set of protrusion structure, there are preferably more. Preferably, there is are a plurality of sets of recess structure in the filter head, and most preferably, there are two sets of lock recesses 24, each with its connected radial lock portion 40. Preferably, therefore, the cooperating protrusion structure 33 number the same as the recess structure.

Figure 3:
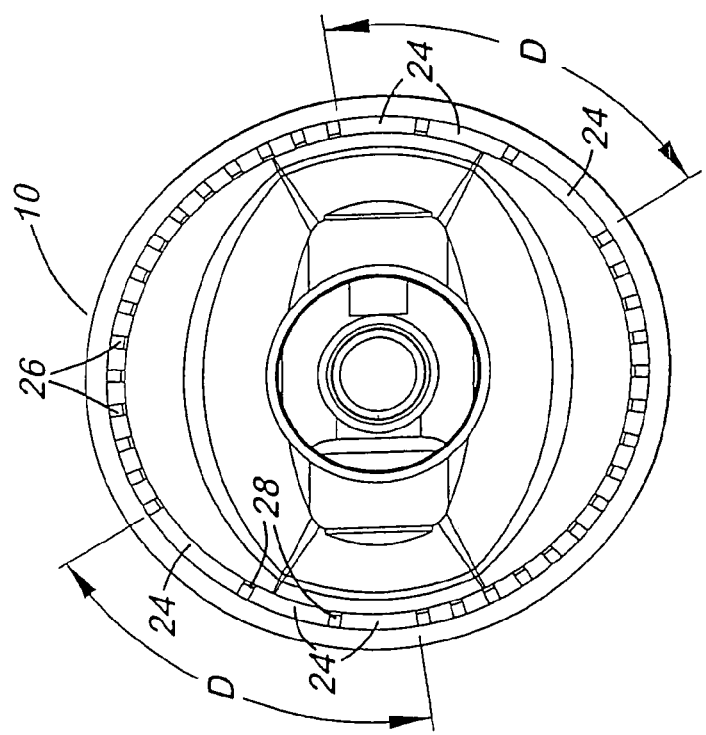
FIG. 3 is a bottom view of the filter head of FIG. 1, showing particularly the interior surfaces of the filter head.

Referring to FIGS. 3 and 4, one may see that the circumferential distances of greatest interest may be described as:

D, which is the circumferential length of the preferred recesses and the preferred cooperating key protrusions 34;

B, which is the distance between the sets of lock recesses or between the sets of cooperating key protrusions 34, wherein B includes the radial lock portion 40 of the recess structure, wherein lock portion 40 may exist in the range of only a small part of distance B to substantially all of distance B except for a small radial rotation stop; and T, which is the total distance between the "start" of one set of lock recesses or cooperating protrusions and the "start" of the adjacent set.

The absolute lengths of D, T, and B, and the lengths of D, T, and B relative to each other, may be varied. In the example of two sets of recess structure (and therefore the two sets of cooperating protrusion structure) each of the two sets may have different D lengths.

In FIG. 1, the first set of two recesses is clearly shown, and the second set of recesses, located about 180 degrees (distance T) from the first set, is located at position 25 on FIG. 1. Thus, these two sets of recesses shown in the Figures are generally diametrically opposed, with the axial portion (lock recesses 24) taking up 70 degrees (distance D) and the radial lock portion 40 taking up about 70 degrees of the 110 degrees (distance B) which extends between the two sets of lock recesses 24. This results in each part of a recess structure 22 being 180 degrees away from the corresponding part of the other recess structure, and the two recess structures 22 being spaced evenly around the entire 360 degrees.

Preferably, the lock portion is as long as the entire length of the key protrusions, however, this is not always necessarily the case. The recess structures 22 may be closer together (distance T) than 180 degrees, for example, with two identically-constructed or differently-constructed recess structures spaced 90 degrees (distance T), for example, in which case the lock recesses 24 might take up about 70 degrees of that 90 degrees, leaving up to slightly less than 20 degrees (20 degrees minus enough distance for a small rotation stop) for the radial lock portion 40. This would be an example of an embodiment in which the radial lock portion is not as circumferentially long as the circumferential length of the axial portion. In such an embodiment, only some of the key protrusions 34 (or part of a key protrusion), would slide radially into ("be engaged in") the lock portion, while some of the key protrusions 34 (or part of a key protrusion) would not be received ("not engaged") in the lock portion; this would be sufficient, although not preferred, for locking the cartridge in the head. In the case of the lock portion being shorter in length than the total length of the key protrusions and a key protrusion(s) being unengaged in the lock portion, one or more protrusions or a part of a protrusion, in effect, would hang over the recesses. In such a case, the unengaged key protrusion(s) might still be supported by one or more ridges 28. As long as some of the key protrusion(s) is/are engaged in the lock portion, the filter cartridge is engaged in the head, until the filter cartridge is rotated in reverse to an unlock point, that is, to a point where all necessary key protrusions slide can slide down through the recesses.

Another example would be to have the two recess structures within only a portion of the circumference of the head 10, for example, within 180 degrees (for two recess structures where T=90 degree) or 270 degrees (for two recess structures where T=135 degrees).

Preferably, the recesses in each set of recesses are all contained within 90 degrees or less (distance D) or, more preferably, within 70 degrees or less (distance D). Especially preferred embodiments have recesses (and likewise cooperating protrusions) from a maximum of 70 degrees down to a minimum of 30 degrees on the circumference of the inner rim of the filter head. Less than 30 is also possible, but is less preferred. In FIG. 1, the first set of recesses is within about 70 degrees ( "D" in FIGS. 3 and 4).

Distance B may be within a wide range of lengths. For example, preferably, but not necessarily, B may be up to about 150 degrees (B equals 150 degrees when, for example, D is 30 degrees and T is 180 degrees) and down to about 30 degrees (B equals 30 degrees when, for example, D is 70 degrees and T is 100 degrees; or B equals 30 degrees when, for example, D is 30 degrees and T is 60 degrees). Other B distances may be outside the range of 30-150 degrees, particularly when B is very large (greater than 150 degrees) because D is very small (less than 30 degrees) or when B is very small (less than 30 degrees) because the two sets of recesses are very close together. In the case where B is very small, one would expect many of such embodiments to have radial lock portions only a fraction of the length of D, that is, only part of the key protrusions would fit into the radial lock portion before hitting a rotation stop in the radial lock portion.

Also shown in FIG. 4 are lengths 134, 134', 134" of the key protrusions (which preferably equate to very slightly less than the lengths of the matching lock recesses 24), and the lengths of spaces 128, 128' between the protrusions (which preferably equate to very slightly more than the lengths of the matching ridges 28). Preferably, but not necessarily, the lengths 134, 134', 134" (which are not necessarily equal to each other) are much greater than the lengths of the spaces 128, 128' (which are not necessarily equal to each other). For example, preferably the lengths of said protrusion are at least twice that of said spaces, and, more preferably three times or more.

FIG. 2 illustrates a filter cartridge 20 that is keyed to cooperate with the head 10 of FIG. 1. The central neck 29 of the filter cartridge contains the connections/seals for fluid communication between the cartridge and the head. Radially spaced from the neck 29 is shoulder 32. On shoulder 32 are two sets 33 of key protrusions 34, generally diametrically opposed to match the locations of the two sets of lock recesses in the filter head. Each set of key protrusions includes the same number, size, and arrangement of key protrusions 34 as the filter head has lock recesses, so that the "key" of the filter cartridge fits into the "lock" of the filter head, in effect. The preferred key protrusions curve on the radius of the shoulder of the cartridge and have a curved outer surface from top to bottom. To match the recesses, each set of protrusions in the embodiment of FIG. 2 include three "end-to-end" protrusions, sized large, medium, and small, in sizes generally equal to the recesses in FIG. 1.

Figure 5:
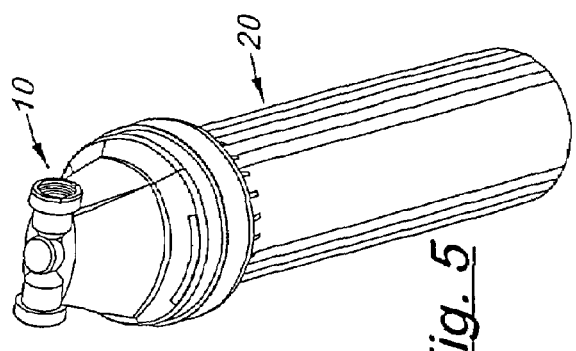
FIG. 5 is a top perspective view of the filter cartridge and filter head of FIGS. 1-4 connected together.
Figure 6:
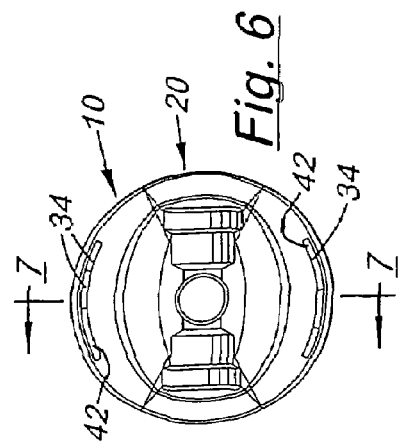
FIG. 6 is a top view of the cartridge and head combination of FIG. 5, with protrusions of the filter cartridge visible through apertures in the filter head.
Figure 7:
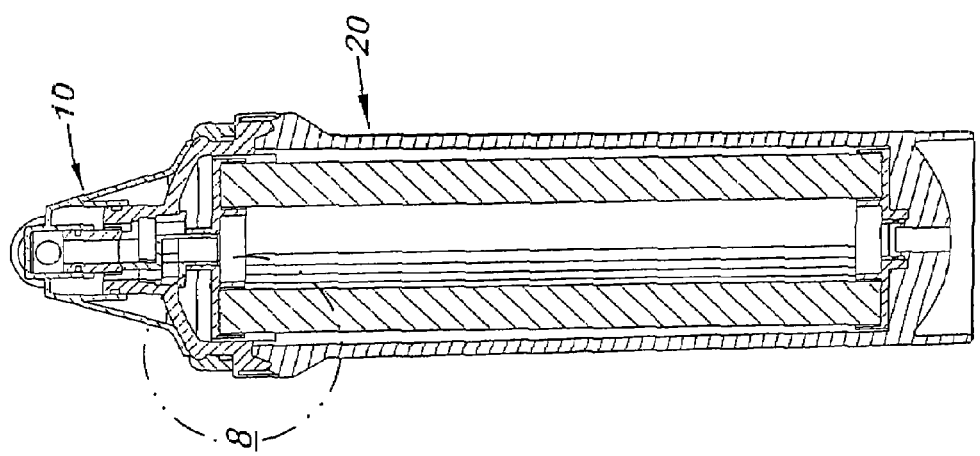
FIG. 7 is a side cross-sectional view of the cartridge and head combination of FIGS. 5 and 6, viewed along the lines 7-7 in FIG. 6.
Figure 8:
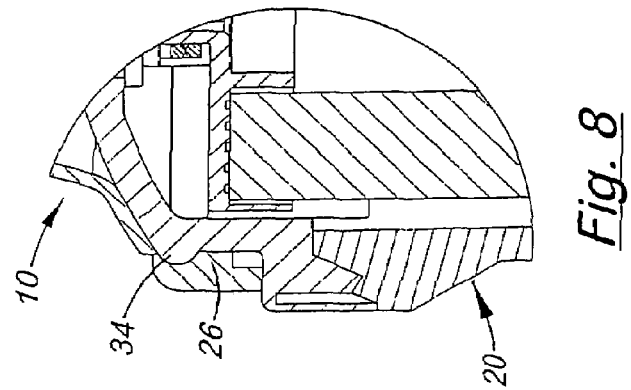
FIG. 8 is an enlarged detail view of a portion of the cross-sectional FIG. 7.
Figure 9:
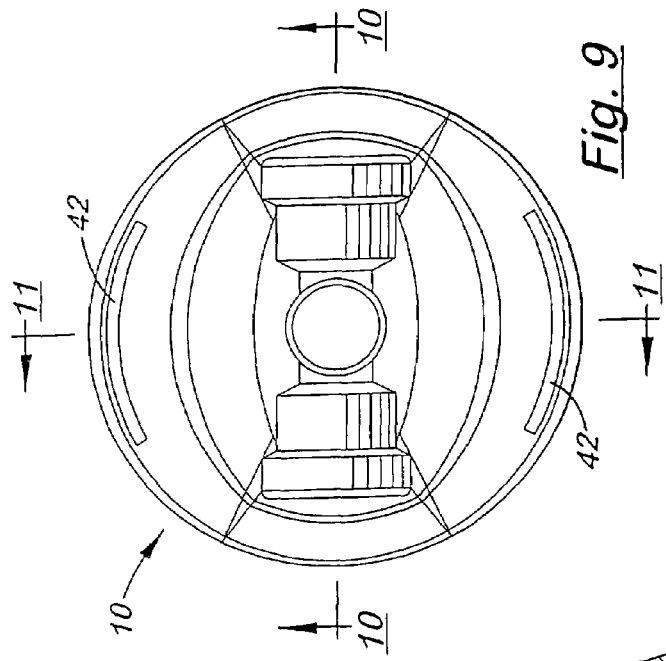
FIG. 9 is a top view of the filter head of FIGS. 1, 3, 5-8, with the filter cartridge removed.
Figure 10:
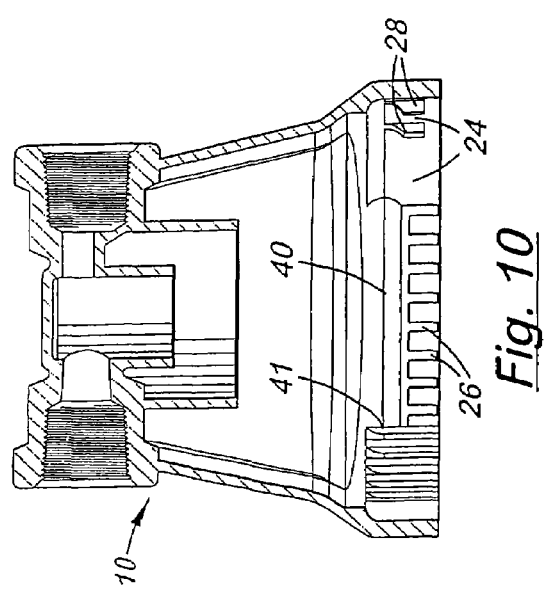
FIG. 10 is a side cross-sectional view of the filter of FIGS. 1, 3 5-9, with the filter cartridge removed, viewed along the lines 10-10 in FIG. 9.
Figure 11:
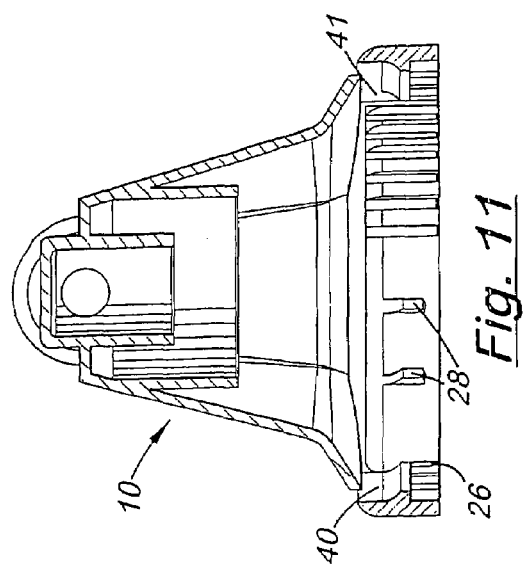
FIG. 11 is a side cross-sectional view of the filter of FIGS. 1, 3 5-10, with the filter cartridge removed, viewed along the lines 11-11 in FIG. 9.

In use, when the filter cartridge 20 is inserted into the head 10, the key protrusions 34 must be matched up with the lock recesses 24 so that the filter cartridge can be moved axially into the filter head. The protrusions 34 slide into their corresponding lock recesses 24 (which are the first portion of the recess system) and the inner rim of the head extends down over the top of the filter cartridge. Then, the filter cartridge is rotated on its axis relative to the head to lock the cartridge into the head. This is made possible by the second portion of the recess system of the filter head, the radial lock portion 40, which extends continuously above the ridges 26 for preferably, but not necessarily, a distance equal to or slightly greater than the total length of one set of protrusions. When the cartridge is inserted and rotated, the protrusions 34 slide circumferentially into the radial lock portion 40 of the recess system until being fully rotationally engaged (rotationally limited by the stop at the end of the lock portion) and are "locked" above the ridges 26 by virtue that they cannot be pulled axially downward past the ridges 26. When the filter cartridge is fully inserted and locked into the head, as shown in FIGS. 5 and 6, one may see the protrusions 34 through the apertures 42 in the filter head wall. To remove the filter cartridge, the cartridge is rotated on its axis in the opposite direction to move the protrusions 34 from above the ridges 26 to again align with lock recesses 24, so that the protrusions may slide axially down and out of the head through the recesses. Frictional means or biasing means, or other locking means, may be used to bias the filter cartridge from sliding in reverse out of the head until the user purposely removes the filter cartridge.

With the invented key system for filter cartridge and head, it is economical and convenient to mold sets of cartridges and heads with matching key system structure, and to mold many different sets with different key system structure. For example, for one application, a key system structure may include four lock recesses and four key protrusions in each of two sets on the cartridge and on the head, and the recesses and protrusions may be, for example, two short alternating with two long. For another application, a key system structure may include three recesses and three protrusions, all of which are long. Cartridges with the three-recess and protrusion key system would not fit into heads with the four-recess and protrusion key system, so there would be no chance of mixing up the cartridges.

Keyed Fluid Connector (FIGS. 12-36):

An alternative embodiment of the invented keyed system provides the key system structure on surfaces of the filter cartridge and the holder that work to provide a fluid connection/seal in addition to physical connection. FIGS. 12-22 illustrate one such tubular connector embodiment, comprising a bracket 210 that is a fluid-conducting holder for holding and sealing to a filter cartridge 211. The bracket 210 and cartridge 211 include tabs and slots on the tubular connectors that create a physical connection and fluid communication between the bracket and cartridge.

Figure 12:
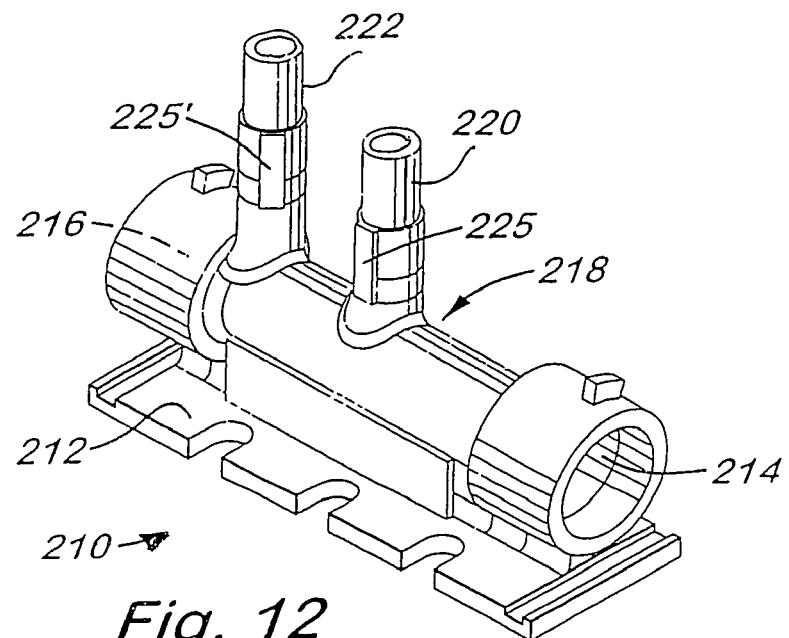
FIG. 12 is a perspective view on an alternative embodiment of a filter holder, a bracket with keyed structure on connection tubes that connect to and fluidly seal to an alternative embodiment of filter cartridge.
Figure 13:
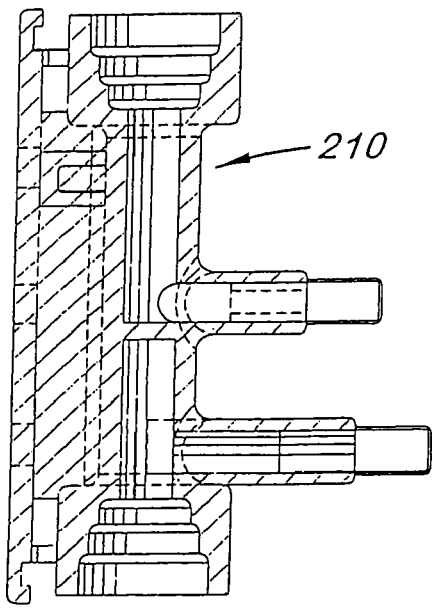
FIG. 13 is a bottom, cross-sectional view of the filter holder of FIG. 12.
Figure 14:
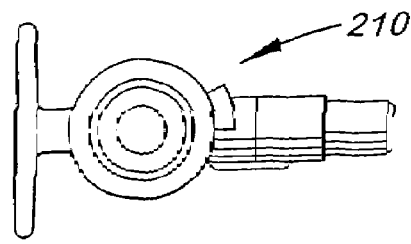
FIG. 14 is an end view of the filter holder of FIGS. 12 and 13.
Figure 15:
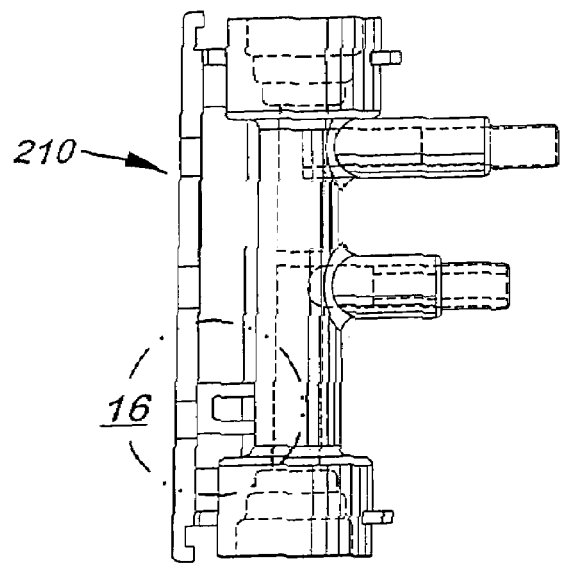
FIG. 15 is a top view of the filter holder of FIGS. 12-14.
Figure 16:
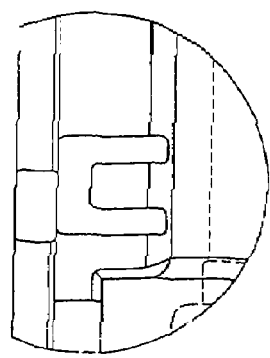
FIG. 16 is a detail view of Section "16" of FIG. 15, of the filter holder of FIGS. 12-15.
Figure 17:
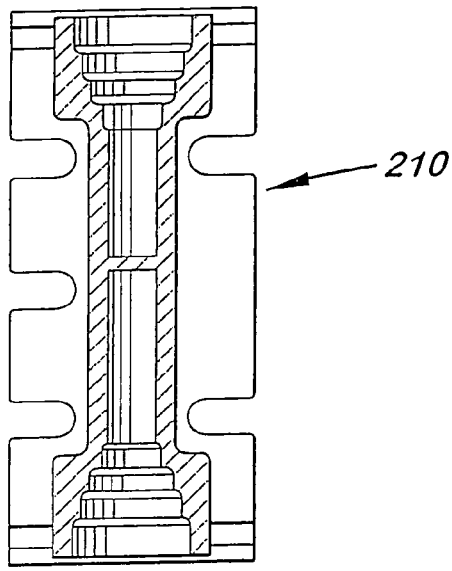
FIG. 17 is a front, cross-sectional view of the filter holder of FIGS. 12-16.

In FIG. 12 is shown the bracket 210 that serves several functions: mounting means for securing the bracket to a wall of other surface, fluid receiving means, inlet tube for conveying liquid to the filter connected to it (not shown in FIGS. 12-19, but shown separately in FIGS. 20-22); outlet tube for conveying liquid from the filter; and fluid dispensing means for sending the filtered/treated liquid downstream to another filter, process, storage, or use. Specifically, plate 212 may be attached to a wall or other surface for supporting several brackets in various flow configurations. Inlet 214 and outlet 216 are at opposite ends of a conduit device 218, and may be used so that inlet 214 receives fluid from an upstream pipe or other conduit and that outlet 216 delivers filtered fluid (that has exited the filter cartridge) to its downstream destination. The conduit device 218 directs flow into the inlet tube 220 so that the fluid may flow into the filter cartridge, and then receives flow from the cartridge into the outlet tube 222 so that it may flow out through outlet 216. Male tubes 220 and 222 have "standouts" or tabs 225,225' on their outer cylindrical surfaces.

Figure 18:
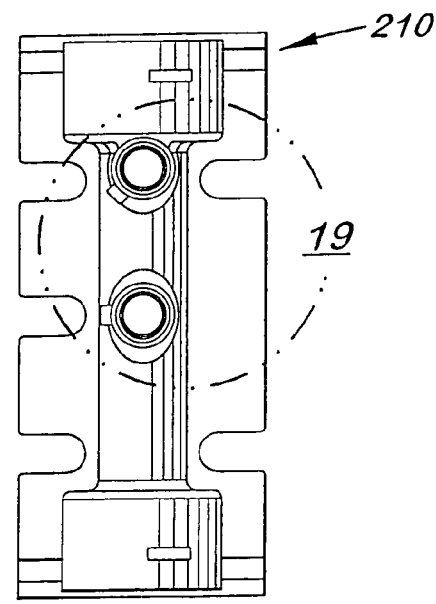
FIG. 18 is a front view of the filter holder of FIGS. 12-17.
Figure 19:
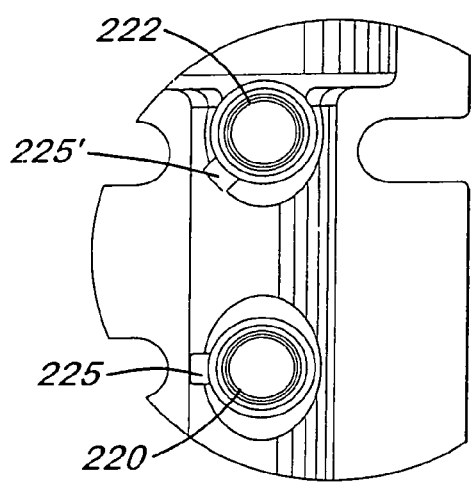
FIG. 19 is a detail view of the inlet and outlet tubes of the filter holder of FIGS. 12-18, viewed as detail "19" of FIG. 18.

As best seen in FIGS. 18 and 19, tube 220 and tube 222 have tabs 225, 225' protruding about 30 degrees offset from each other (tab 225 of tube 220 out to the left in FIG. 19 and tab 225' of tube 222 down about 30 degrees from the tab 225 of tube 220). The cooperating filter cartridge 228 shown schematically in FIG. 20 has female inlet and outlet tubes 230 and 232 (which may also be called an inlet port and outlet port), and one may notice that tubes 230 and 232 have matched or "mating" internal slots 227, 227' to receive the tabs 225, 225'. Alternatively, of course, filter cartridges might be made with male tubes and tabs and cooperating holders may be made with female tubes and slots, in keeping with the idea that the key protrusions may be placed on either the filter or the holder, and the lock recess may therefore be placed on the other item.

Figure 20:
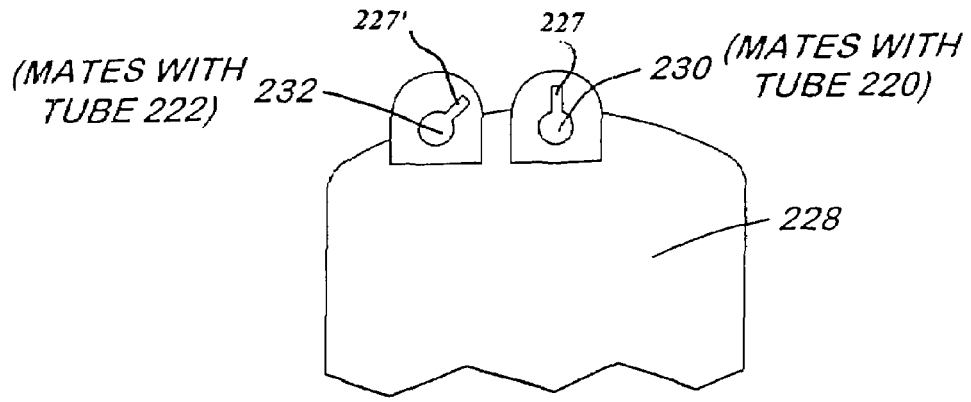
FIG. 20 is a partial side view of one embodiment of a filter cartridge, which is adapted to cooperate with the filter holder of FIGS. 12-19.
Figure 21:
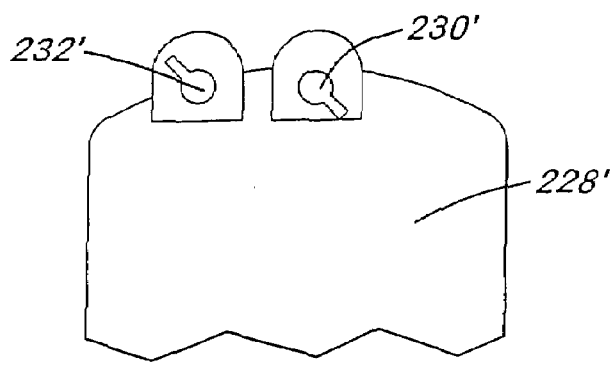
FIG. 21 is a partial side view of a filter cartridge of the type cooperating with the filter holder of FIGS. 12-19, but with an alternatively-angled key system structure.
Figure 22:
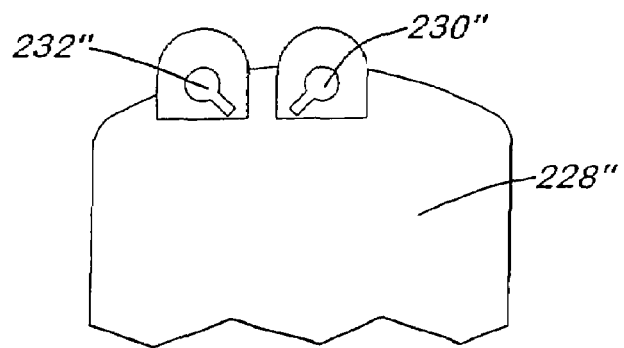
FIG. 22 is a partial side view of a filter cartridge of the type cooperating with the filter holder of FIGS. 12-19, but with an alternatively-angled key system structure.
Figure 29:
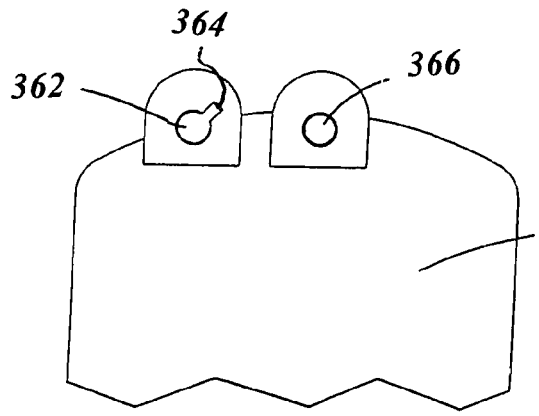
FIGS. 29 and 30 illustrate a filter and a bracket, respectively, that have a key system on one of the two tubular connectors, that is, on one pair of female and male tubes (shown not to scale).
Figure 30:
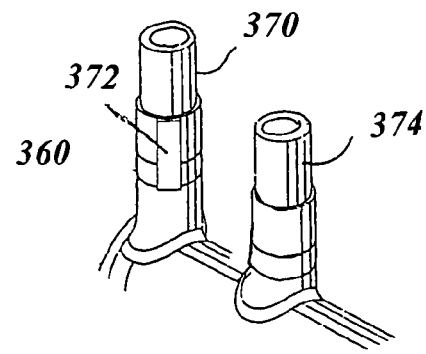
Figure 31:
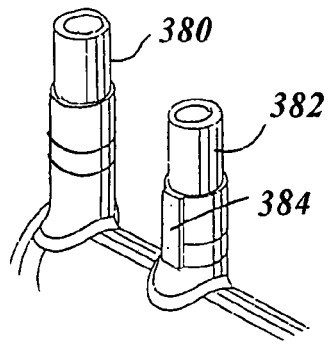
FIGS. 31 and 32 illustrate another embodiment of a bracket and a filter, respectively, that have a key system on one of the two tubular connectors, that is, on one pair of female and male tubes (shown not to scale).
Figure 32:
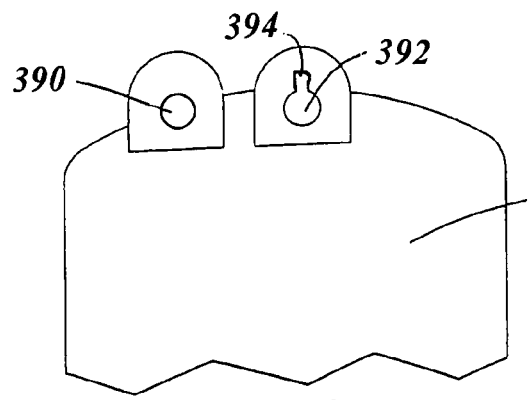

One may see that, by varying the radial location of the tabs and slots, one could arrive at many "keys" and "locks" for the cartridge-holder sets. For example a holder could have an inlet tube with a tab at 60 degrees from a reference point and the outlet tube could have a tab at 120 degrees relative to that reference point, as long as the proper cartridge for that holder is made with the same offset and the same absolute location of slots. FIGS. 12-20 illustrate only one of the many possible combinations of possible tab radial locations, which are extremely numerous because the radial location of each of the tubes may be varied in each set, and may be varied independently. FIGS. 21 and 22 illustrate two of the many other possible key system structures. For example, in the top end of elongated filter cartridge 228' of FIG. 21, the female inlet tube (port) 230' is keyed at about 110 degrees, and the female outlet tube (port) 232' is keyed at about 290 degrees. In the top end of elongated filter cartridge 228" of FIG. 22, the inlet tube 230" is keyed at about 195 degrees and the outlet tube 232" is keyed at about 170 degrees.

The bracket 10 in FIGS. 12-19 typically is installed in a process with the plate 212 vertically attached to a vertical wall. Thus, tubes 220 and 222 extend out horizontally, and the filter cartridge is pushed onto the tubes 220, 222 so that the tubes 220 and 222 support and connect with the filter cartridge. Associated with the tubes 220, 222, 230, 232 are o-rings or other sealing structure to provide liquid-tight communication between the bracket and the cartridge. Although it is not shown, one may see from FIGS. 12-19 that liquid-tight seals are made between piping or other conduit and the inlet 214 and outlet 216. Additionally, a fastening device may be added to further secure the cartridge in sealed relationship with the tubes 220, 222.

As explained earlier, key protrusions may be placed on either the filter or the holder, and the lock recess may therefore be placed on the other item. Thus, the male and female tubes may be generally interchangeable on the bracket/holder and filter. For example, a male tube(s) 302, 304 with key tab(s) 306, 308, such as shown in FIG. 23, may be provided on a filter 310 rather than on a bracket, and a female tube 312, 314 with slot(s) 316, 318, such as shown in FIG. 24, may be provided on a bracket/holder 320. Another example is shown in FIGS. 25-27, wherein female tubes 330, 332 with slots 334, 336 on a bracket/holder 338 cooperate with male tubes 340, 342 with tabs 344, 346 on a filter 350.

Figure 33:
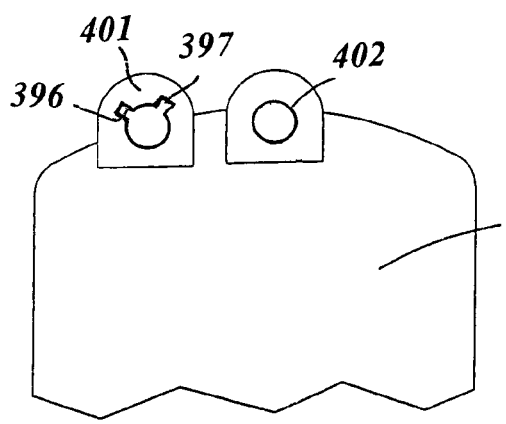
FIGS. 33 and 34 illustrate yet another embodiment of a filter and a bracket, respectively, that have a key system on one of the two tubular connectors, that is, on one pair of female and male tubes (shown not to scale), and wherein the key system includes two slots in the one female tube and two tabs extending from the one male tube.
Figure 34:
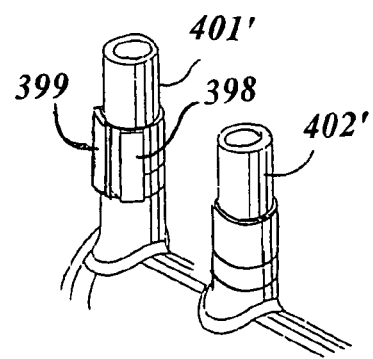

FIGS. 29-34 illustrate examples of other key systems wherein only one of the tubular connectors is keyed. Specifically, filter 360 includes one female tube 362 having slot 364, while female tube 366 has no slot. Male tube 370 has tab 372, while male tube 374 has no tab. Similarly, male tube 380 has no tab, but male tube 382 has tab 384, and female tube 390 has no slot, but female tube 392 has slot 394. FIGS. 33 and 34 illustrate an example of multiple slots 396, 397 and tabs 398, 399 being provided on one tubular connector (combination of 401 and 401'), while no key system is provided on the other tubular connector (combination of 402 and 402').

One may note that many filter embodiments having a keyed tubular connector are not rotated on the filter axis after insertion into a cooperating holder/bracket, and need not be rotated in order to remain securely sealed to the holder/bracket. For example, once the keyed filter is inserted into/onto the holder/bracket, a pivotal lid, strap, retainer, or other fastening device may be added to further secure the cartridge to the holder/bracket, for example, by encircling a part of the top end of the filter. See, for example, FIG. 28, which illustrates a fastening device 405 that pivots around/onto the top end of the filter to help retain the tubular connectors in a securely sealed position. Thus, such a filter is usually not "twisted," "screwed," or otherwise rotated it on its axis in order to secure it into its holder, and, thus, the key and lock (such as a tab and slot) of such a filter slide together to mate but typically do not slide past each other, as they do not need to "clear" each other to allow rotation of the filter relative to the holder. This is especially the case when a filter and holder/bracket features two adjacent tubular connectors, wherein the female or male tubes acting as inlet and outlet ports on the filter are not both (and perhaps neither) located on the longitudinal axis of the filter. Such a filter will slide onto/into its holder, mating with the tubular connector tubes (male or female) of the holder/bracket, and will not be able to rotate relative to the holder/bracket because the filter is fixed to the holder/bracket at two places that are adjacent but not coaxial with each other. Therefore, the preferred keyed tubular connector system is one in which the key(s) and lock(s) of the female and male tubes of the tubular connector(s) are mated and in contact during installation of the filter into/onto the holder and continue to be mated and in contact during use of the filter, as opposed to sliding past each other so that the filter may be rotated relative to the holder.

Universal Key and Adaptor System

Preferably, the invented system also includes an optional universal key feature that may be supplied to the client/customer, wherein a single "universal cartridge" is made that may be used on a plurality of differently-keyed filter holders. The "universal" cartridge may be, for example, a cleaning cartridge, a sanitization cartridge, a media regeneration cartridge, a special treatment cartridge, or a testing cartridge, wherein it is more convenient and economical for the user to have a universal cartridge fitting all of the user's or manufacture's variously-keyed holders. This may be, for example, because the user wants to use a single universal cartridge for cleaning of all his various filtration or treatment processes and does not want to invest in differently-keyed cleaning cartridges for each differently-keyed holder. Also, this way, a manufacturer that supplies different customers with large volumes of differently-keyed holders and cartridges (for their main filtration and treatment process) may supply all the customers with the same universal-key cartridge for special or infrequent processes such as cleaning or media regeneration. This allows the manufacturer to maintain profitability even on the small volumes of cleaning or other infrequent-use cartridges that are required, by saving the expense of manufacturing and monitoring proper shipment of many differently-keyed cleaning cartridges.

The universal cartridge includes a "lock recess" or "key protrusion" (depending on whether the system is a recess-on-cartridge or a protrusion-on-cartridge system) at every location where any of the holders involved have a corresponding recess or protrusion. For example, if a manufacturer produces holders and cartridges that are keyed with recesses and protrusions at 30 degree increments, the universal cartridge for the holders involved will have recesses or protrusions at every 30 degrees. For example, if a manufacturer produces holders and cartridges that have recesses and protrusions on fluid tubular connectors at 12 o'clock and 5 o'clock for one client and at 3 o'clock and 11 o'clock for another client, that manufacturer may produce a universal cleaning cartridge with recesses or protrusions at all of the positions of 12, 3, 5, and 11 o'clock.

While the preferred keyed system includes keying of the holder and the filter cartridge, it may also include keying of an adaptor that is keyed to properly fit and cooperate with the keyed structure of the holder, and that has an unkeyed connected to a conventional, unkeyed filter cartridge. Thus, while figures such as FIGS. 20-22, 28, 29, 32, 34, 35, and 36 may illustrate keyed top ends of filter/cartridges, the "top end" structure drawn in these figures could also be the structure of an adaptor, which fluidly connects to the keyed holder/bracket as shown and described, and which receives a non-keyed cartridge at its lower end, for example, inside a lower, interior concave space having fluid connections between the non-keyed cartridge and the adaptor.

Preferred Universal Key Option

For the tubular-connector-type keyed system, and for many of the various possible keyed systems for filter cartridges and filter holders, a universal key is desirable as an option for some circumstances. This universal key preferably takes the form of a filter cartridge that is adapted to fit any and all of the various differently-keyed holders that a manufacturer supplies to a single client/customer, or, alternatively, a filter cartridge that is adapted to fit any and all of the various differently-keyed holders that a manufacturer supplies to all of its clients/customers. This allows an economical answer to the issue of providing differently-keyed main process filtration or treatment cartridges to a customer or to several customers while providing a single cleaning or other infrequent-use cartridge to a customer for all the customer's special applications, or to all customers for all their special applications. In other words, while there are good reasons to provide differently-keyed cartridges to different customers or to a single customer for his various uses, it may be important to have a single cartridge that is usable in all the customers' filtration/treatment systems, or at least in a plurality of differently-keyed holders.

Figure 35:
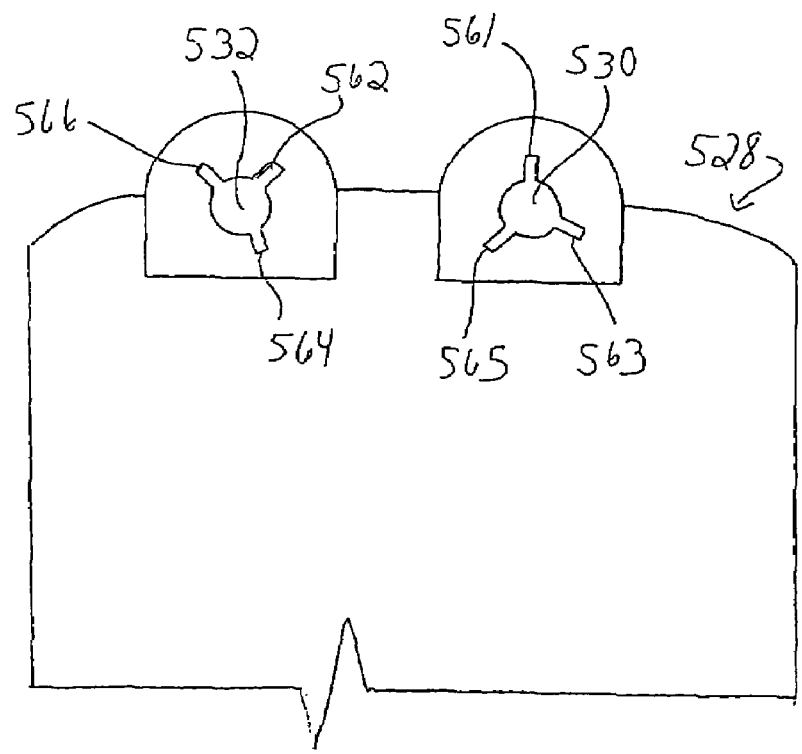
FIG. 35 is a partial side view of an embodiment of a universal cartridge that is adapted to fit into all the filter holders/brackets that receive the differently-keyed cartridges shown in FIGS. 20-22.

A universal key system preferably comprises a filter cartridge that is adapted to fit a plurality or all of the differently-keyed holders that a manufacturer makes or that are supplied to a client/user. For example, in FIG. 35 is shown schematically a top end 528 of (or may be formed as an adaptor for) a filter cartridge that is adapted to fit onto all three of the holders for which the three cartridges 228. 228', 228" in FIGS. 20, 21, and 22 are made. That is, the FIG. 35 cartridge 528 has ports 530 and 532 that have multiple slots 561, 562, 563, 564, 565, 566 that extend radially from the center of the ports and that are positioned so that cartridge 528 will slide onto and properly liquid-seal with the three holders. This way, cartridge 528 is "universally-keyed" with a total of six slots to fit a plurality of holders, which holders each have only one slot per port.

Figure 36:
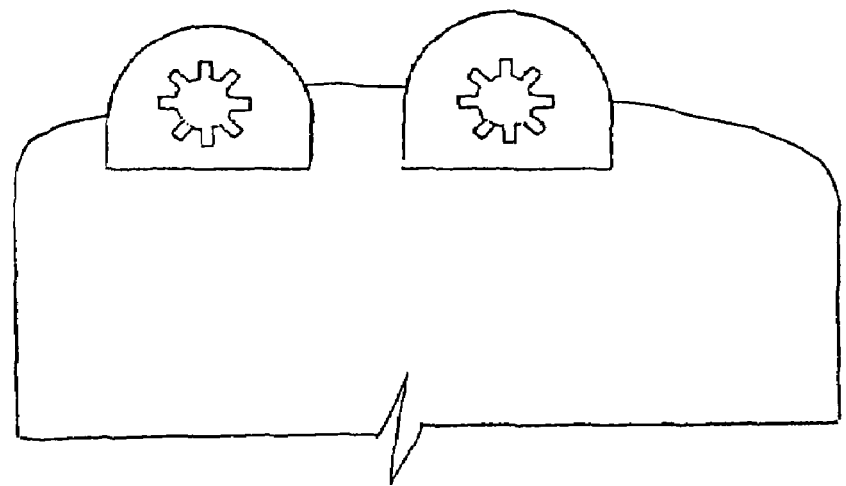
FIG. 36 illustrates another embodiment of a universal cartridge that is adapted to fit into all the holders/brackets that receive the differently-keyed cartridges with 45 degree-spaced slots.

FIG. 36 illustrates a universally-keyed cartridge top end (or adaptor) that is keyed to fit with any and all holders that have tabs on male tubes that are positioned straight up (at "12 o'clock") and at various positions 45 degrees from that. For example, each of the two cartridge top end female tubes has eight slots radially extending out at straight up (0 degrees), 45 degrees, 90 degrees, 135 degrees, 180 degrees, 225 degrees, 270 degrees, and 315 degrees. This way, there are many combinations of one or more tabs on each of the male tubes that may be provided to a customer or customers, and the single cartridge in FIG. 36 will fit onto any of these 45 degrees version male holders. This way, the manufacturer may supply the same universally-keyed cleaning cartridge for many different customers that have requested differently-keyed cartridges for their main filtration/treatment processes.

After reading this description, one may understand that a universal key cartridge may be supplied for various keyed systems. For example, a universal key cartridge may be made for a keyed system wherein a filter cartridge shoulder that does not liquid seal to a valve head may include the appropriate universal-keying to fit into several valve heads with different key structures. Or, a tubular connector type system may include otherwise-shaped tabs and slots, for example, such as rounded bump-shaped tabs and slots.

Although this invention has been described above with reference to particular means, materials and embodiments, it is to be understood that the invention is not limited to these disclosed particulars, but extends instead to all equivalents within the scope of the following claims.

I claim:

1. A keying system for a filtration unit, the keying system comprising:
    a filter having a filter longitudinal axis and a cooperating holder, the filter and cooperating holder being removably connected and sealed to each other, for conveyance of fluid into the out of the filter from the holder, by two tubular connectors each comprising a male tube and a female tube;
    wherein at least one of said tubular connectors comprises a key system comprising a tab protruding from an outer surface of the male tube of said at least one tubular connector and a slot provided in an inner surface of the female tube of said at least one tubular connector;
    wherein said two tubular connectors are adjacent to each other and not coaxial, so that the filter, when connected to the cooperating holder, cannot rotate relative to the cooperating holder on said filter longitudinal axis; and
    wherein said tab and said slot are mated and in contact with each other when the filter is installed in the cooperating holder and when the filter is in use and fluid is being conveyed into and out of the filter.

2. A keying system as in claim 1, wherein the locations of the tab and the slot are selectively locateable to different circumferential locations on said outer surface and said inner surface to prevent said filter from being installed in any but its cooperating filter holder.

3. A keying system as in claim 1, wherein said male tubes of the tubular connectors are provided on the cooperating holder and the female tubes of the tubular connectors are provided on the filter.

4. A keying system as in claim 1, wherein said male tubes of the tubular connectors are provided on the filter and the female tubes of the tubular connectors are provided on the cooperating holder.

5. A keying system as in claim 1, wherein the male tube of said at least one tubular connector has a single tab extending out from its outer surface.

6. A keying system as in claim 5, wherein the female tube of said at least one tubular connector has a single slot.

7. A keying system as in claim 1, wherein the male tube of said at least one tubular connector has multiple tabs extending out from its outer surface.

8. A keying system as in claim 7, wherein the female tube of said at least one tubular connector has multiple slots.

9. A keying system as in claim 1, wherein both of said two tubular connectors comprise a key system, wherein male tubes of both tubular connectors have at least one tab and female tubes of both tubular connectors have at least one cooperating slot.

10. A keying system as in claim 1, further comprising a fastening device extending from the cooperating holder to encircle a portion of the top end of the filter to secure the filter to the holder.

11. A keying system as in claim 10, wherein the fastening device is a pivotal lid.

* * * * *